United States Patent
Yamada et al.

(10) Patent No.: US 8,553,359 B2
(45) Date of Patent: Oct. 8, 2013

(54) MAGNETIC RECORDING HEAD AND MAGNETIC RECORDING/REPRODUCING APPARATUS USING THE SAME

(75) Inventors: Kenichiro Yamada, Tokyo (JP); Katsuhiko Koui, Tokyo (JP); Mariko Kitazaki, Kanagawa-ken (JP); Masayuki Takagishi, Tokyo (JP); Tomomi Funayama, Tokyo (JP); Masahiro Takashita, Kanagawa-ken (JP); Soichi Oikawa, Tokyo (JP); Akihiko Takeo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 75 days.

(21) Appl. No.: 12/853,690

(22) Filed: Aug. 10, 2010

(65) Prior Publication Data

US 2011/0205667 A1 Aug. 25, 2011

(30) Foreign Application Priority Data

Feb. 19, 2010 (JP) ................................. 2010-034951

(51) Int. Cl.
*G11B 5/127* (2006.01)
(52) U.S. Cl.
USPC .................................. 360/125.02; 360/125.3
(58) Field of Classification Search
USPC .......................................... 360/125.3, 125.02
See application file for complete search history.

(56) References Cited

U.S. PATENT DOCUMENTS

| | | | | |
|---|---|---|---|---|
| 5,838,521 A * | 11/1998 | Ravipati | ........................ | 360/319 |
| 6,804,089 B2 * | 10/2004 | Funayama et al. | ............ | 360/321 |
| 6,811,890 B1 * | 11/2004 | Zhou et al. | ................. | 428/828.1 |
| 6,936,763 B2 * | 8/2005 | Rizzo et al. | .................... | 174/391 |
| 6,980,402 B2 * | 12/2005 | Shinjo | ............................ | 360/319 |
| 7,322,095 B2 | 1/2008 | Guan et al. | | |
| 7,957,098 B2 * | 6/2011 | Yamada et al. | ............ | 360/125.3 |
| 2005/0219771 A1 | 10/2005 | Sato et al. | | |
| 2008/0112087 A1 * | 5/2008 | Clinton et al. | ................ | 360/317 |
| 2008/0268291 A1 * | 10/2008 | Akiyama et al. | .............. | 428/812 |
| 2008/0304176 A1 * | 12/2008 | Takagishi et al. | ............... | 360/86 |
| 2009/0052095 A1 | 2/2009 | Yamada et al. | | |
| 2009/0080106 A1 * | 3/2009 | Shimizu et al. | ................. | 360/75 |
| 2011/0134561 A1 * | 6/2011 | Smith et al. | ..................... | 360/59 |

FOREIGN PATENT DOCUMENTS

| | | |
|---|---|---|
| JP | 2003-297629 | 10/2003 |
| JP | 2007-88121 | 4/2007 |
| JP | 2009-4089 | 1/2009 |
| JP | 2010-3351 | 1/2010 |
| JP | 2010-40126 | 2/2010 |
| WO | WO 2005/086184 A1 | 9/2005 |

OTHER PUBLICATIONS

Office Action issued Jan. 6, 2012, in Japanese Patent Application No. 2010-034951 (with English-language translation).

* cited by examiner

*Primary Examiner* — Will J Klimowicz
*Assistant Examiner* — Carlos E Garcia
(74) *Attorney, Agent, or Firm* — Oblon, Spivak, McClelland, Maier & Neustadt, L.L.P.

(57) ABSTRACT

A magnetic recording head includes a magnetic pole, a spin torque oscillator, a first shield and a second shield. The magnetic pole has an air-bearing surface. The spin torque oscillator is provided so that a first side of the spin torque oscillator faces the magnetic pole in a first direction parallel to the air-bearing surface. The first shield includes a granular magnetic material, and is provided so that two portions of the first shield sandwich the spin torque oscillator in a second direction which is parallel to the air-bearing surface and perpendicular to the first direction. The second shield is provided on a second side of the spin torque oscillator opposite to the first side.

11 Claims, 8 Drawing Sheets

MAGNETIC RECORDING HEAD AND MAGNETIC RECORDING/REPRODUCING APPARATUS USING THE SAME

CROSS REFERENCE TO RELATED APPLICATION

This application is based upon and claims the benefit of priority from the prior Japanese Patent Application No. 2010-034951, filed on Feb. 19, 2010, the entire contents of which are incorporated herein by reference.

FIELD

The present invention relates to a magnetic recording head and a magnetic recording/reproducing apparatus using the same.

BACKGROUND

A magnetic recording head is disclosed, which is provided with a side shield to shield a leaked magnetic field generated by a magnetic pole thereof, in a published US patent application (see USP-A 2005/0237665).

However, when a spin torque oscillator is embedded in the magnetic recording head disclosed in the published US patent application, the side shield is not capable of sufficiently absorbing a radio frequency magnetic field. This is due to an RF magnetic field as high as 15 GHz to 30 GHz which a spin torque oscillator generates. That is, the RF magnetic field leaks from the side shield. Hereinafter, a spin torque oscillator is referred to as "STO". The "radio frequency" is referred to as "RF".

Therefore, when writing is performed onto a magnetic recording medium using such a magnetic recording head with STO embedded, the RF magnetic field leaks to tracks adjacent to the targeted track of the magnetic recording head. There is a possibility that the RF magnetic field having leaked to the adjacent tracks erases data previously recorded on the magnetic recording medium. Furthermore, there is another possibility that the RF magnetic field having leaked to the adjacent tracks deteriorates the magnetic recording medium. As a result, it is problematic that the bit error rate of the adjacent tracks rises.

This will make it difficult to perform an RF field-assist recording with higher recording density.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and not limited to the scope of the invention.

DETAILED DESCRIPTION

Embodiments will be described below with reference to drawings. Wherever possible, the same reference numerals or marks will be used to denote the same or like portions throughout figures, and overlapped explanations are omitted in embodiments following a first embodiment.

First Embodiment

Figure 1:
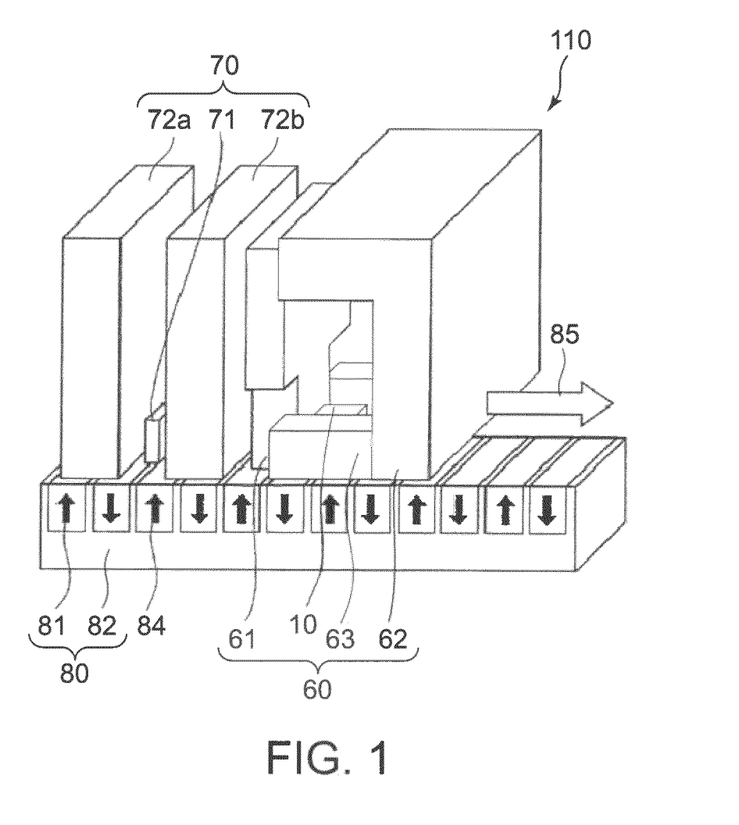
FIG. 1 is a view showing a magnetic recording head and a magnetic recording medium according to a first embodiment.

FIG. 1 is a view showing a magnetic recording head 110 and a magnetic recording medium 80 according to a first embodiment. An arrow 85 denotes the traveling direction (a first direction) of the magnetic recording medium 80. A direction perpendicular to the arrow 85 on the surface of the magnetic recording medium 80 denotes a track width direction (a second direction).

A magnetic recording head 110 according to the embodiment is provided with a read head portion 70 and a write head portion 60.

The read head portion 70 is provided with magnetic shield layers 72a and 72b. Moreover, a magnetic reproducing element 71 is further provided between the magnetic shield layers 72a and 72b.

The write head portion 60 is provided with a magnetic pole 61, a return path 62 (a second shield), a RF shield 63 (a first shield), and a spin torque oscillator (STO) 10. Moreover, the write head portion 60 is provided with the magnetizing coil (not shown).

In addition, each element which constitutes the read head portion 70 and the write head portion 60 is separated by an insulator, such as alumina (not shown).

A GMR (Giant Magneto-Resistance) element, a TMR (Tunnel Magneto-Resistive effect) element, etc. can be employed for the magnetic reproducing element 71, for example. Moreover, the magnetic reproducing element 71 is mounted between two magnetic shield layers, i.e., the magnetic shield layers 72a and 72b in order to improve the reproduction resolution thereof.

Figure 2:
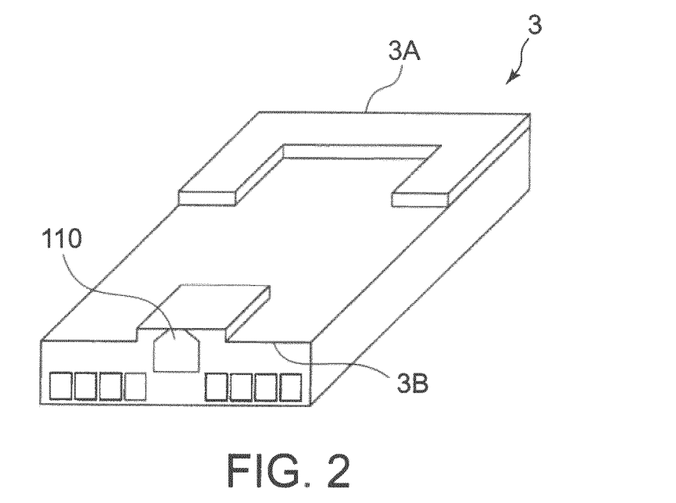
FIG. 2 is a view showing a head slider carrying the magnetic recording head according to the first embodiment.

FIG. 2 is a view showing a head slider 3 carrying the magnetic recording head 110 according to the embodiment.

The head slider 3 includes $Al_2O_3/TiC$, etc., and is designed to be produced so that the head slider 3 is capable of moving relatively to the magnetic recording medium 80, e.g., a magnetic disk while flying above or in contact with the magnetic recording medium 80. The head slider 3 also includes an air inflow side 3A and an air outflow side 3B. The magnetic recording head 110 is arranged on the side surface of the air outflow side 3B.

The magnetic recording medium 80 has a substrate 82 and a magnetic recording layer 81 formed on a substrate 82. A magnetic field is applied from the write head portion 60 to the magnetic recording medium 80 to thereby perform writing. Then, the magnetization of the magnetic recording layer 81 is prevented to be in a prescribed direction. The magnetization direction of the magnetic recording layer 81 is read out using the read head portion 70 to perform reading.

Figure 3:
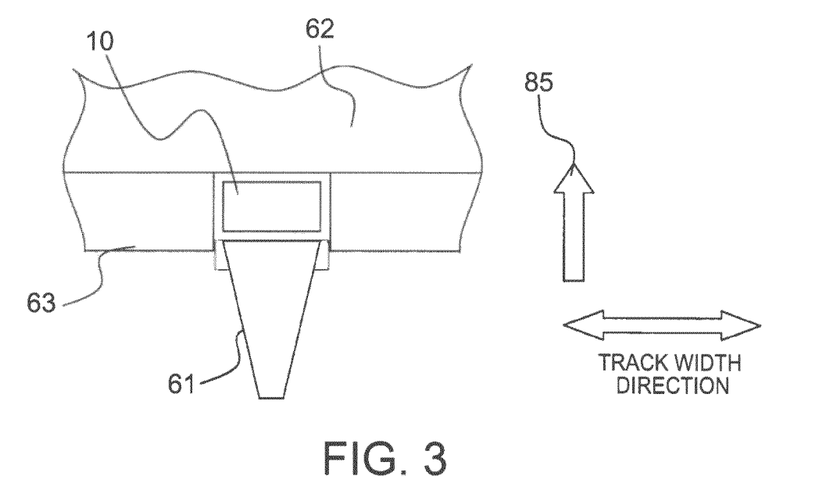
FIG. 3 is a view showing a composition of the magnetic recording head according to the first embodiment, which is viewed perpendicularly from the surface of a magnetic recording medium.

FIG. 3 is a view showing a air-bearing surface of the write head portion 60 viewed perpendicularly from the surface of the magnetic recording medium 80. The arrow 85 shows the traveling direction of the magnetic recording medium 80. Moreover, the magnetic pole 61 has a air-bearing surface. That is, STO 10 is provided adjacent to the magnetic pole 61 in the first direction 85 parallel to the air-bearing surface. Then, STO 10 is sandwiched by the RF shields 63 in the track width direction (the second direction). The track width direction is parallel to the paper plane of FIG. 3. Moreover, the RF shields 63 include a granular magnetic material.

Moreover, in the direction (the first direction) perpendicular to the track width direction, the return path 62 is arranged on a side opposite to the side adjacent to the magnetic pole 61 of STO 10. The return path 62 includes an alloy magnetic material. The magnetic pole 61 doubles as a first electrode, and the return path 62 doubles as a second electrode. The first electrode (the magnetic pole 61) and the second electrode (the return path 62) are connected to STO 10. The first electrode (the magnetic pole 61) and the second electrode (the return path 62) pass an electric current (referred to as a "current" below) through in the lamination direction of STO 10. A current is passed through STO 10 in the lamination direction thereof to make STO 10 stably oscillate. In addition, it is preferable that the first and second electrodes are formed directly in contact with STO 10. Alternatively, a highly conducting material may be provided between STO 10 and the first electrode, or between STO 10 and the second electrode.

The magnetic pole 61 or the return path 62 does not necessarily double as an electrode. That is, when both the magnetic pole 61 and the return path 62 do not double as an electrode, either one of the two, i.e., the magnetic pole 61 and the return path 62 which do not double as an electrode, is provided with another electrode to allow it to pass a current through STO 10. That is, another electrode may be provided in a direction perpendicular to the air-bearing surface to pass a current through STO 10. In this case, the magnetic pole 61 and the return path 62 can be in contact with each other at a back yoke, thereby reducing a magnetic resistance of a magnetic circuit therebetween to allow it to improve an efficiency of the circuit. That is, even a small current to be passed through the magnetizing coil generates a high recording magnetic field (having a large intensity). As a result, a capability of recording on a targeted track increases, and a more acceptable bit error rate can be obtained.

The granular magnetic material mean a composite material with fine magnetic grains dispersed in a nonmagnetic matrix.

The granular magnetic material is employed to reduce interactions due to exchange coupling among the magnetic grains constituting the granular magnetic material. The reduced interactions allow magnetization of each magnetic grain to more freely respond to an external field. Therefore, the RF magnetic field generated by STO 10 can be absorbed into the granular magnetic material. This will cause an abrupt intensity distribution of the RF magnetic field in the magnetic recording medium 80. That is, a leaked RF magnetic field applied to adjacent tracks can be reduced. As a result, a magnetic disturbance affecting the adjacent tracks can be reduced on writing. This prevents the erase or deterioration of information previously written on the adjacent tracks, thereby allowing it to obtain a more acceptable bit error rate.

It is preferable that the size of the RF shield 63 is as large as that of STO 10 in the track width direction. Because, in case that the RF shields 63 are longer than STO 10 in the track width direction, the RF shields 63 interact with the magnetic pole 61. Moreover, in case that the RF shields 63 are shorter than STO 10 in the track width direction, there is a possibility that the magnetic field generated by the magnetic pole 61 is larger than a magnetic field which the RF shields 63 can absorb. Therefore, the interaction between STO 10 and the granular magnetic material can be made smaller in this way. As a result, it is possible to make STO 10 stably oscillate with a smaller drive current, thereby performing stable RF field-assist recording.

The material selected from the group consisting of FeCo, FeCoSi, NiFe, CoZrNb, FeN, FeSi, FeAlSi, FeCoAl, and CoNiFe, for example, can be employed for the granular magnetic grains. These materials have high saturation magnetization and an excellent soft magnetic property so that even a small volume of the materials can absorb the RF magnetic field. The materials have a high effect to absorb the RF magnetic field, thereby reducing the RF magnetic field leaked into the adjacent tracks. As a result, a magnetic disturbance affecting the adjacent tracks can be reduced on writing. This prevents the erase or deterioration of information previously written on the adjacent tracks, thereby allowing it to obtain a more acceptable bit error rate.

The anisotropy field Hk of the magnetic grains contained in the granular magnetic material is preferably higher so that a resonant frequency $f_{res}$ of the granular magnetic material is higher than the frequency $f_{STO}$ of the RF magnetic field generated by STO 10. Here, the resonant frequency $f_{res}$ is a product of the anisotropy field Hk and the gyro constant of the magnetic grains. In addition, the gyro constant γ is 2.88 GHz/kOe. Generally, a magnetic material efficiently absorbs an RF magnetic field having a frequency lower than a resonant frequency $f_{res}$. For this reason, when the magnetic grains are employed which have the anisotropy field Hk so that the frequency $f_{STO}$ of the RF magnetic field is higher than the resonant frequency $f_{res}$ of the magnetic grains, a leaked RF magnetic field applied to adjacent tracks can be reduced. Then, a magnetic disturbance affecting the adjacent tracks can be reduced on writing. This prevents the erase or deterioration of information previously written on the adjacent tracks, thereby allowing it to obtain a more acceptable bit error rate.

The material selected from the group consisting of CoCr, CoCrPt, CoCrTa, CoCrTaPt, CoCrTaNb, TbFeCo, CoPt, FePt, CoPd, FePd, and SmCo, for example, can be employed for the magnetic grains of the granular magnetic material. Such materials have a large anisotropy field. The larger the anisotropy field, the higher the resonant frequency of the magnetic materials. Therefore, a magnetic material having a larger anisotropy field is employed to allow the magnetic material to absorb the RF magnetic field more efficiently, and reduces a magnetic disturbance affecting the adjacent tracks on writing. As a result, the erase or deterioration of information previously written on the adjacent tracks is prevented, thereby allowing it to obtain a more acceptable bit error rate.

The form of the magnetic grain in the granular magnetic material is preferably globular. Making the form of the magnetic grain globular eliminates shape anisotropy therefrom, thereby allowing the magnetic grain to equally absorb the RF magnetic field in any direction. Alternatively, the form of the magnetic grain may be made ellipsoidal or columnar. The ellipsoidal or columnar form increases shape anisotropy allows it to prevent a total anisotropy field with respect to the shape anisotropy and a crystalline anisotropy. Thereby, the effect to absorb the RF magnetic field can be increased in accordance with the oscillating frequency of STO 10.

It is more preferable that magnetic grains contained in the granular magnetic material are superparamagnetic.

A superparamagnetic state means a state where magnetization direction of a magnetic material becomes random owing to a thermal energy. Magnetization of the magnetic material normally aligns in one direction owing to anisotropy energy (hereinafter referred to as Ku(erg/cc)). However, when the size of a magnetic body is made smaller, the product of Ku (erg/cc) and the volume (V (cc)) for the magnetic body can be smaller than the thermal energy ($k_B T$ (erg/K-K)) in some cases. At this time, the magnetization direction of the magnetic body becomes random, and the magnetic body becomes superparamagnetic. Here, $k_B$ is a Boltzmann constant and its value is $1.38 \times 10^{-16}$ (erg/K).

Reducing the magnetic body into a superparamagnetic state allows the magnetic body to homogeneously absorb any RF magnetic fields independently of directions of the RF magnetic fields and the direction of the anisotropy field of the magnetic body. Furthermore, a leaked RF magnetic field applied to adjacent tracks can be reduced. This prevents the erase or deterioration of information previously written on the adjacent tracks, thereby allowing it to obtain a more acceptable bit error rate.

Next, a condition is explained under which the magnetic grains of the granular magnetic material are in a superparamagnetic state.

The condition causing the superparamagnetic state is expressed with the following general formula.

$$K_u V < k_B T \quad \text{(Formula 1)}$$

First, FeCoSi, NiFe, CoZrNb, FeN, FeSi, FeAlSi, FeCoAl, and CoNiFe with high saturation flux density and an excellent soft magnetic property are explained when these materials are employed for magnetic grains of the granular magnetic material.

$K_u$ of these materials is about $1 \times 10^4$ erg/cc. Moreover, the absolute temperature T (K) is assumed to be 400K when heat generations by passing a current through STO 10, a heater for dynamic flying height and the ambient temperature are taken into consideration.

When the above assumption is taken into consideration, the formula 1 is fulfilled, provided that the magnetic grain size of the granular magnetic materials employing the above-listed materials is 22 nm or less. As a result, it is shown that the magnetic grains with the size are superparamagnetic.

CoCr, CoCrPt, CoCrTa, CoCrTaPt, CoCrTaNb, TbFeCo, CoPt, FePt, CoPd, FePd, and SmCo having a strong anisotropy field are explained to be employed for the magnetic grains of the granular magnetic material.

The temperature for the formula 1 is assumed to be 400K as well as in the above-mentioned explanation.

First, $K_u$ of CoCr, CoCrTa, and TbFeCo is about $4 \times 10^6$ erg/cc. In this case, the formula 1 will be fulfilled when the size of the magnetic grains is about 3 nm or less.

Next, $K_u$ of CoCrPt, CoCrTaPt, CoCrTaNb, CoPt, and CoPd is about $8 \times 10^6$ erg/cc. In this case, the formula 1 is fulfilled when the size of the magnetic grains is about 2.5 nm or less.

Next, $K_u$ of FePd is about $5 \times 10^7$ erg/cc. Moreover, $K_u$ of SmCo is about $1 \times 10^8$ erg/cc. In this case, employing FePd or SmCo requires a grain size of 1 nm or less to fulfill formula 1. However, magnetic grains of these materials are considered to be superparamagnetic when the grain sizes thereof are 2 nm to 3 nm. This is because the magnetic grains with a size larger than the above-mentioned size are considered to be partially ordered to have a Ku value of $5 \times 10^6$ erg/cc.

In addition, "ordered" means that atoms are regularly-arranged within a unit crystal lattice to have a long-term regularity. When not "ordered", various elements can enter the respective atomic sites in a crystal lattice randomly. On the other hand, when "ordered", only a specific element can enter a specific atomic site. When partially "ordered", some elements easily enter a specific atomic site whereas other elements do not enter the specific atomic site easily. This difference due to kinds of elements produces a long-term regularity. The degree of "ordered" is evaluated for the granular magnetic material containing ordered magnetic grains using an X-ray diffraction method or transmission electron microscopy. That is, when the granular magnetic material is ordered, characteristic peaks involved in ordering of the granular magnetic material appear. The peaks never appear in a disordered magnetic material. This is because a new diffraction pattern arises owing to the long-term regularity.

In addition, although the minimum size of the magnetic grains is not limited, the size is preferably 1 nm or more when designing the magnetic recording head is taken into consideration.

Oxides such as $Al_2O_3$ and $SiO_2$, nitrides such as SiN and AlN, carbides such as SiC, etc. are employed for the nonmagnetic matrix of the granular magnetic materials. Employing these materials for the nonmagnetic matrix causes a clear phase separation between the matrix and the magnetic grains, thereby allowing it to disperse the fine magnetic grains in the matrix without deteriorating the magnetic properties. The leaked RF magnetic field applied to adjacent tracks can be reduced. This prevents the erase or deterioration of information previously written on the adjacent tracks, thereby allowing it to obtain a more acceptable bit error rate. Since these materials for the matrix are insulators, it is possible to insulate the magnetic pole 61 (first electrode) and the return pass (second electrode) from each other, thereby allowing it to stably pass a current through STO 10. Here, the magnetic pole 61 (first electrode) passes a current through STO 10.

Moreover, STO 10 and the RF shields 63 may be directly in contact with each other, or may be separated from each other via nonmagnetic films, such as a $Al_2O_3$ film. This is to optimize the intensities of the RF magnetic fields on the targeted track just below the magnetic pole 61 and the tracks adjacent thereto so that a more acceptable bit error rate can be obtained.

Figure 4:
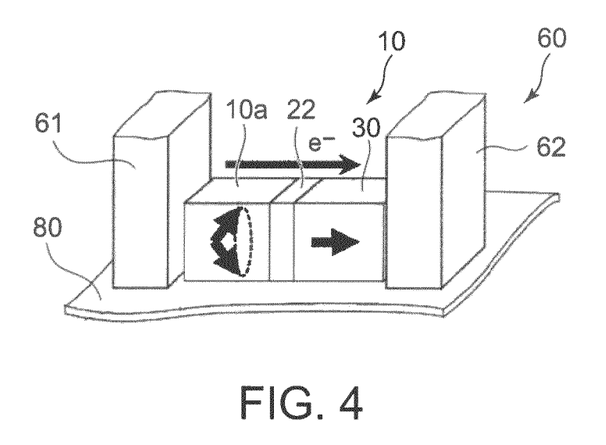
FIG. 4 is a view showing a composition of a spin torque oscillator built in the magnetic recording head according to the first embodiment.

FIG. 4 is a view showing a composition of the write head portion 60.

As shown in FIG. 4, STO 10 has a layered structure with a spin injection layer 30 (second magnetic layer), an intermediate layer 22 with high spin transmissivity and an oscillation layer 10*a* (first magnetic layer) stacked between the magnetic pole 61 and the return path 62. Moreover, the magnetic pole 61 applies a magnetic field to STO 10, and serves as a first electrode to pass a current through STO 10 via the oscillation layer 10*a* (first magnetic layer). The return path 62 returns the magnetic field applied from the magnetic pole 61 thereto, and serves as a second electrode to pass a current through STO 10 via the spin injection layer 30 (second magnetic layer).

STO 10 passes a driving electron current through the return path 62 (second electrode) from the magnetic pole 61 (first electrode) to generate an RF magnetic field from the oscillation layer 10*a*. Applying the RF magnetic field generated by STO 10 to the magnetic recording medium 80 enables RF field-assist recording.

When a current is passed through a magnetizing coil, the write head portion 60 generates a magnetic field to perform perpendicular magnetic recording on the magnetic recording medium 80. That is, the write head portion 60 generates a magnetic field between the magnetic pole 61 and the return path 62. Furthermore, a magnetic field is applied also to STO 10. The spin injection layer 30 and the oscillation layer 10a have a coercivity lower than the magnetic field to be applied to STO 10. Therefore, an oscillation angular velocity vector of STO 10 has a polar character depending on the magnetic field to be applied to STO 10. For this reason, even if the polarity of the drive current is unchanged, the polarity of the angular velocity vector of an elliptically-polarized RF magnetic field on the magnetic recording medium 80 has the same direction as that of the recording magnetic field, thereby allowing it to perform excellent recording independently of the polar character of the writing current.

As mentioned above, the RF shields 63 are placed on the both sides of STO 10 in the track width direction to prevent the RF magnetic field from leaking to adjacent tracks. Therefore, the RF magnetic field is maintained on the targeted track just below the magnetic pole 61, thereby allowing it to prevent an increase in the bit error rate on the adjacent tracks while obtaining a more acceptable bit error rate on the main track.

First Modified Example

Figure 5:
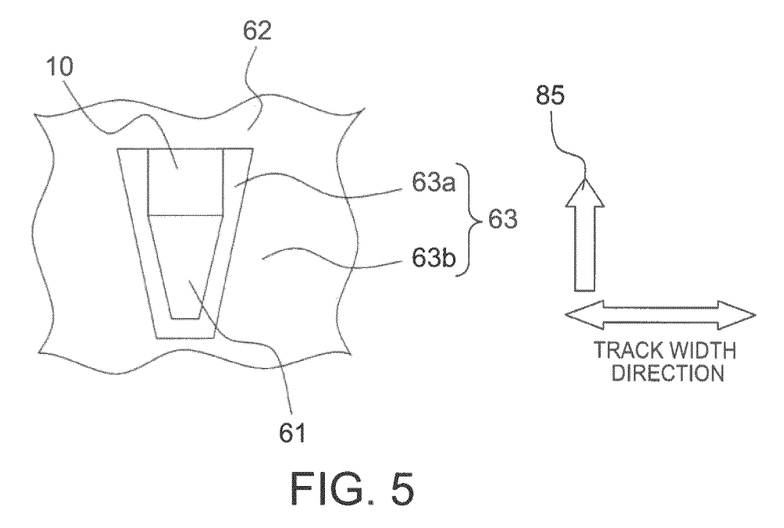
FIG. 5 is a view showing a first modified example of the magnetic recording head according to the first embodiment.

FIG. 5 is a view showing a first modified example of the magnetic recording head 110 according to the first embodiment. FIG. 5 is a view specifically showing the write head portion 60 viewed perpendicularly from the surface of the magnetic recording medium 80. The arrow 85 shows the direction of movement of the magnetic recording medium 80. The track width direction is parallel to the paper plane of FIG. 5.

In this modified example, a lamination structure of a first material 63a (first shield) is provided in a position other than a plane on the side opposite to the side of STO 10 adjacent to the magnetic pole 61. Then, a lamination structure of a second material 63b (second shield) is provided so that the second material 63b encompasses the area of STO 10 without the first material 63a provided and the area of the first material 63a. That is, STO 10 is provided next to the magnetic pole 61 in the first direction parallel to the air-bearing surface. Then, the first material 63a is provided across the magnetic pole 61 and STO 10 in the track width direction perpendicular to the first direction. In addition, the first material 63a is provided so that the first material 63a encompasses STO 10 and the magnetic pole 61 except on the side of STO 10 opposite to another side of STO 10 adjacent to the magnetic pole 61. The first material 63a is covered with the second material 63b in a plane including the air-bearing surface. The side of STO 10 opposite to another side of STO 10 adjacent to the magnetic pole 61 is covered with the second material 63b in the first direction perpendicular to the track width direction. Alternatively, the magnetic pole 61 does not have to be provided with the first and second materials 63a, 63b in the track width direction. The side of the magnetic pole 61 opposite to another side of the magnetic pole 61 adjacent to STO 10 does not have to be provided with the first material 63a and the second material 63b covering the first material 63a.

The first material 63a includes a granular magnetic material. The second material 63b includes an alloy magnetic material. The second material 63b also doubles as the return path 62.

Forming the magnetic head as mentioned above can prevent the magnetic field generated by the magnetic pole 61 from leaking to adjacent tracks. Furthermore, STO 10 is provided with the first material 63a on both sides thereof in the track width direction, thereby allowing it to prevent the RF magnetic field generated by STO 10 from leaking to adjacent tracks. Thus, the leakage of the recording magnetic field and the RF magnetic field is prevented to allow it to avoid the erase and deterioration of information previously written on the adjacent tracks. As a result, a more acceptable bit error rate can be obtained on the targeted track just below the magnetic pole 61 and also on the adjacent tracks.

Moreover, the first material 63a is located nearer to STO 10 than the second material 63b. Providing the first material 63a nearer to STO 10 leads to a higher precipitous gradient of the RF magnetic field intensity. As a result, the RF magnetic field intensity can be effectively reduced on adjacent tracks while the RF magnetic field intensity is maintained on the targeted track just below the magnetic pole 61. As a result, the erase and deterioration of information previously written on the adjacent tracks can be prevented. Then, a more acceptable bit error rate can be obtained on the adjacent tracks.

Materials having a high saturation magnetic flux density and an excellent soft magnetic property, such as FeCo, FeCoSi, NiFe, CoZrNb, FeN, FeSi, FeAlSi, FeCoAl, and CoNiFe, are employed for the second material 63b. These materials include the same materials as those employed for the first material 63a. However, the first material 63a including the granular magnetic material whose matrix is nonmagnetic has a lower saturation magnetic flux density owing to the nonmagnetic volume thereof than the second material 63b.

Designing the magnetic recording head as mentioned above allows it to prevent the recording magnetic field from being absorbed intensively into a portion of the RF shield 63, thereby reducing a leaked magnetic field onto adjacent tracks. As a result, the erase and deterioration of information previously written on the adjacent tracks is prevented, and a more acceptable bit error rate is obtained.

Then, employing a material having a high saturation magnetic flux density and an excellent soft magnetic property allows it to reduce a magnetic field leaked from the recording magnetic field generated by the magnetic pole 61 onto adjacent tracks, thereby reducing a magnetic disturbance to the adjacent tracks. As a result, the erase and deterioration of information previously written on the adjacent tracks is prevented, and a more acceptable bit error rate is obtained.

Alternatively, STO 10 and the RF shield 63 may be separated from each other via a nonmagnetic film, such as alumina, to optimize the intensities of the RF magnetic fields on the targeted track just below the magnetic pole 61 and the adjacent tracks. Designing as mentioned above provides a more acceptable bit error rate.

Alternatively, the magnetic pole 61 and the first material 63a may be separated from each other via a nonmagnetic film, such as alumina, to optimize the intensities of the RF magnetic fields at the targeted track just below the magnetic pole 61 and the adjacent tracks. And, the first and second materials 63a, 63b may be separated from each other via a nonmagnetic film, such as alumina, to optimize the intensities of the RF magnetic fields at the targeted track just below the magnetic pole 61 and the adjacent tracks. Designing as mentioned above provides a more acceptable bit error rate.

Alternatively, STO 10 and the return pass 62 may be separated from each other via the first material 63a or a nonmagnetic film, such as alumina, to optimize the intensities of the RF magnetic fields on the targeted track just below the magnetic pole 61 and the adjacent tracks. Designing as mentioned provides a more acceptable bit error rate.

As mentioned above, according to the magnetic recording head of the embodiment, the RF magnetic field is maintained on the targeted track just below the magnetic recording head, thereby allowing it to prevent an increase in the bit error rate on the adjacent tracks while providing a more acceptable bit error rate on the targeted track.

Second Modified Example

Figure 6:
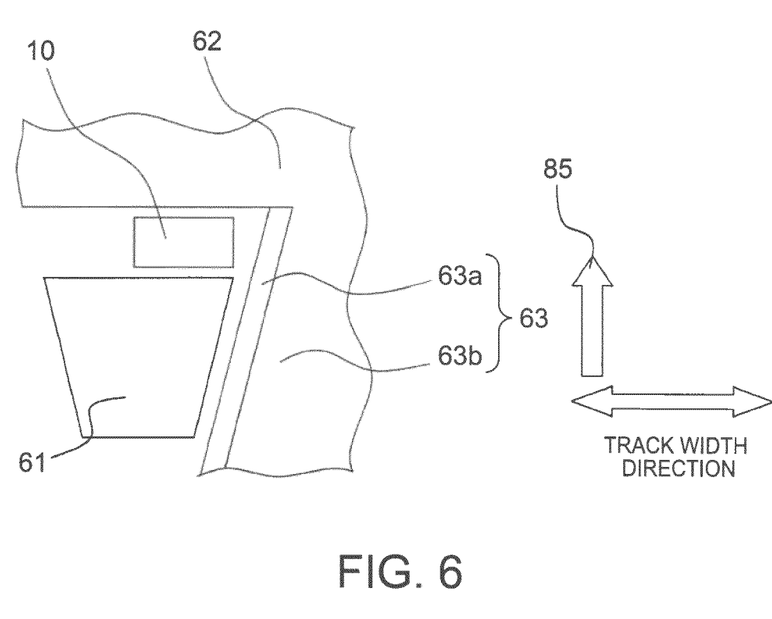
FIG. 6 is a view showing a second modified example of the magnetic recording head 110 according to the first embodiment.

FIG. 6 is a view showing a second modified example of the magnetic recording head 110 according to the first embodiment. FIG. 6 is a view showing the write head portion 60 viewed perpendicularly from the surface of the magnetic recording medium 80. The arrow 85 shows the direction of movement of the magnetic recording medium 80. The track width direction is parallel to the paper plane of FIG. 6.

In this modified example, the magnetic pole 61 doubles as the first electrode and the return pass doubles as the second electrode. The first electrode (magnetic pole 61) and the second electrode (return path 62) are connected to STO 10. A current is passed through STO 10 via the first electrode (magnetic pole 61) and the second electrode (return path 62).

Alternatively, the magnetic pole 61 and the return path 62 do not have to serve as an electrode. In case that one of the magnetic pole 61 and the return path 62 does not serve as an electrode, either one of the two which does not serve as an electrode can be provided with another electrode to pass a current through STO 10. That is, a current may be passed through STO 10 by providing another electrode in the track width direction or in a direction perpendicular to the track width direction in a region without the RF shield 63. In this case, the magnetic pole 61 and the return path 62 can be in contact with each other using a back yoke, thereby reducing a magnetic resistance of the magnetic circuit between the magnetic pole 61 and the return path 62 to improve an efficiency of the circuit. That is, even a small current passing through a magnetizing coil can generate a large recording magnetic field. As a result, the magnetic recording head is more capable of writing onto the targeted track thereof, thereby providing a more acceptable bit error rate.

Moreover, the RF shield 63 has a structure with the first and second materials 63a, 63b stacked. The RF shield 63 is provided only on one side in the track width direction (the second direction) and on another side in the direction (the first direction) perpendicular to the track width direction. Moreover, the first material 63a is provided in the track width direction between the magnetic pole 61 and the second material 63b. The first material 63a is provided in the track width direction also between STO 10 and the second material 63b. That is, STO 10 is provided next to the magnetic pole 61 in the first direction parallel to the air-bearing surface. In the track width direction (the second direction) perpendicular to the first direction, one side of the magnetic pole 61 and the same side of STO 10 are provided with the first material 63a. The second material 63b is provided on the side opposite to the sides of the magnetic pole 61 and STO 10 with respect to the first material 63a in the track width direction. The second material 63b is provided also on the side opposite to the sides of the magnetic pole 61 and STO 10 with respect to the first material 63a in a direction perpendicular to the track width direction. Alternatively, the first material 63a and the second material 63b covering the first material 63a may be provided on the side opposite to the side of the magnetic pole 61 adjacent to STO 10 in the direction perpendicular to the track width direction.

One side of the magnetic pole 61 and the same one side of STO 10 lack the RF shield 63 to thereby generate a large recording magnetic field. The existence of the RF shield 63 reduces a leaked magnetic field which is generated from the recording magnetic field and applied to the adjacent track on the side of the RF shield 63. As a result, an effect to shield the recording magnetic field is increased.

Furthermore, the RF shield 63 is provided on one side of STO 10 in the track width direction. This reduces a leaked magnetic field which is generated from the RF magnetic field and applied to the adjacent track on the side of the RF shield 63 while maintaining the RF magnetic field intensity on the targeted track just below STO 10. As a result, an effect to shield the RF magnetic field is increased in the track width direction.

A leaked magnetic field from the recording magnetic field and the RF magnetic field is reduced to result in a more acceptable bit error rate, while the erase or deterioration of information previously written on the adjacent track is prevented on the side of the RF shield 63.

Recording on the targeted track just below the magnetic pole 61 is followed by recording on the adjacent track on the side without the RF shield 63 to allow it to make the track pitch narrower than the width of the magnetic pole 61 or STO 10 in the track width direction. As a result, narrowing the track pitch provides high density recording.

It is preferable that the side of STO 10 and the edge of the magnetic pole 61 coincide mostly with each other on the side of the RF shield 63 in the track width direction.

Making the side of STO 10 and the edge of the magnetic pole 61 coincide with each other provides a higher effect to shield the recording magnetic field generated by the magnetic pole 61 in the track width direction. This also provides an effect to shield the RF magnetic field generated by STO 10 in the track width direction. Designing as mentioned above provides the prevention of the erase or deterioration of information previously written on the adjacent tracks with a more acceptable bit error rate on the targeted track just below the magnetic pole 61, and also provides a more acceptable bit error rate also on the adjacent tracks.

Magnetic field lines generated from the magnetic pole 61 rapidly lose their parallelism when the width of the magnetic pole 61 is 50 nm or less in the track width direction. For this reason, the width of the magnetic pole 61 is preferably not less than 50 nm in the track width direction, thereby providing a recording magnetic field to stably record on the targeted track just below the magnetic pole 61.

On the other hand, it is known that a necessary current density to oscillate STO 10 increases rapidly when the width of STO 10 is 50 nm or more in the track width direction. Such a large current density makes it difficult to provide the necessary current to stably oscillate STO 10 as a result of heating. Therefore, the width of STO 10 is preferably 50 nm or less in the track width direction, thereby providing a sufficient RF magnetic field for the RF field-assist recording.

Furthermore, the width of the magnetic pole 61 is preferably larger than that of STO 10 in the track width direction. This enables stable RF field-assist recording.

As described above, according to the magnetic recording head 110 of the first embodiment, a more acceptable bit error rate is provided while maintaining the RF magnetic field on the targeted track just below the magnetic recording head 110 and reducing a magnetic disturbance affecting the adjacent tracks, thereby enabling reliable RF-field assist recording.

Second Embodiment

Figure 7:
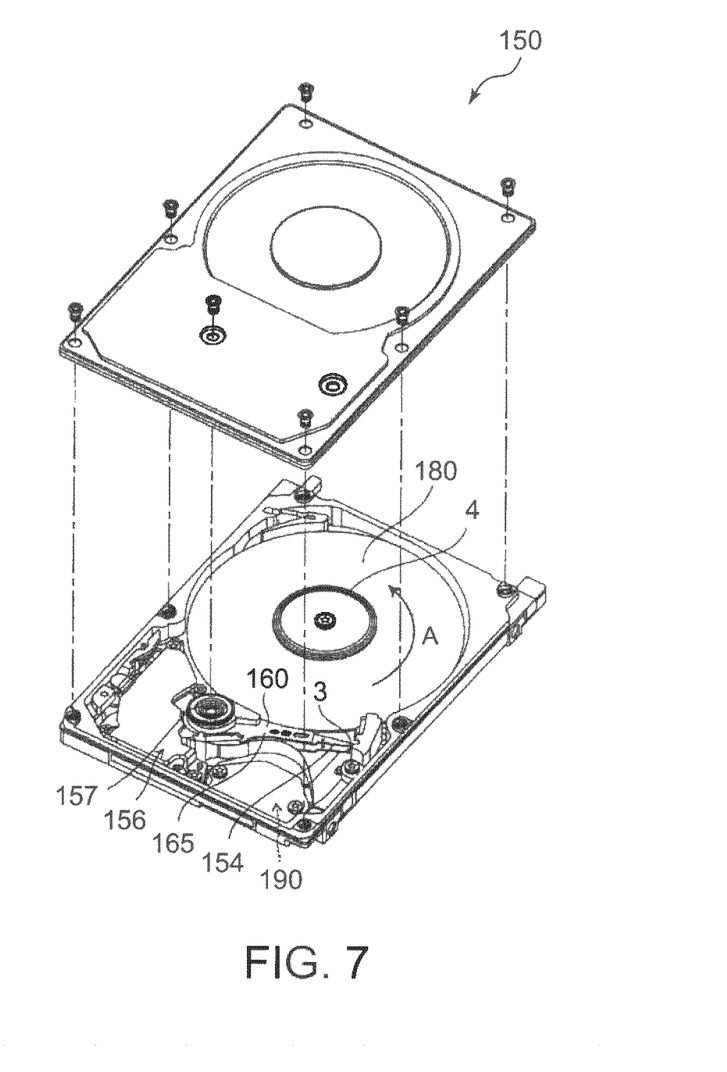
FIG. 7 is a view showing a magnetic recording apparatus according to a second embodiment.

FIG. 7 is a view showing a magnetic recording apparatus 150 according to a second embodiment. FIG. 8 is a view showing a part of the magnetic recording apparatus 150 according to the second embodiment.

As shown in FIG. 7, the magnetic recording apparatus 150 according to this embodiment is a system employing a rotary actuator. In FIG. 7, a recording medium disk 180 is mounted onto a spindle motor 4 and rotated in a direction shown by the arrow A with a motor (not shown) in response to a control signal from a drive control unit (not shown). Alternatively, the magnetic recording apparatus 150 according to this embodiment may be provided with two or more recording medium disks 180.

The head slider 3 carries a magnetic recording head to perform recording/reproduction of information to be stored in the recording medium disk 180, and has the composition mentioned above. The head slider 3 is mounted on the tip of a filmy suspension 154. The magnetic recording head carries any one of the magnetic recording heads 110 according to the first embodiment mentioned above at the tip thereof.

The recording medium disk 180 rotates so that a pressing load due to the suspension 154 is balanced with a force generated on the air-bearing surface of the head slider 3, thereby suspending the air-bearing surface of the head slider 3 above the surface of the recording medium disk 180 with a prescribed flying height. Alternatively, the head slider 3 may be rotated in contact with the recording medium disk 180, which is called a "contact run type".

The suspension 154 is connected to an end of an actuator arm 155 having a bobbin, etc. holding a drive coil (not shown). The other end of the actuator arm 155 is provided with a voice coil motor 156, i.e., a kind of a linear motor. A voice coil motor 156 can be configured with a drive coil (not shown) and a magnetic circuit. The drive coil is wound up onto the bobbin of the actuator arm 155. The magnetic circuit includes a permanent magnet and a facing yoke to sandwich the coil.

The actuator arm 155 is held by ball bearings which are provided on both upper and lower sides of a bearing portion 157, and can rotate slidably by the voice coil motor 156. As a result, it is possible to arrange the magnetic recording head on an arbitrary position of the recording medium disk 180.

Figure 8A:
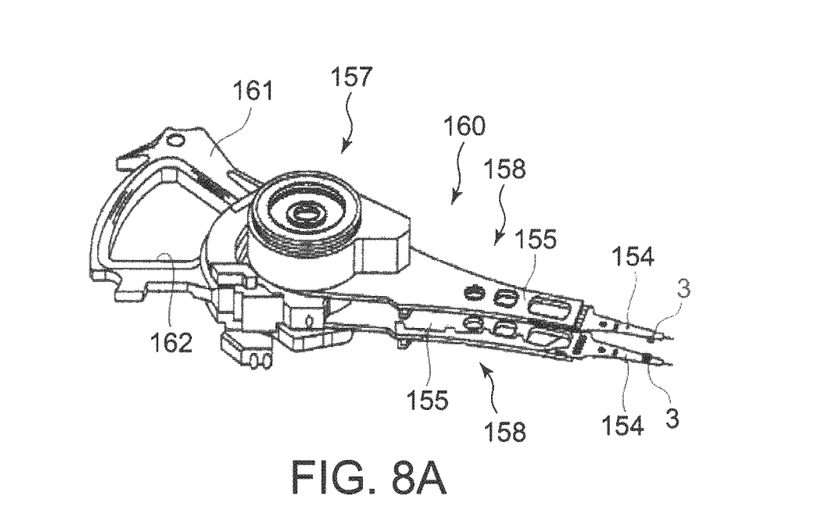
FIGS. 8A and 8B are perspective views illustrating compositions of a part of the magnetic recording apparatus according to the second embodiment.

FIG. 8A is a perspective view illustrating a composition of a part of the magnetic recording apparatus according to this embodiment to enlarge a head stack assembly 160.

Figure 8B:
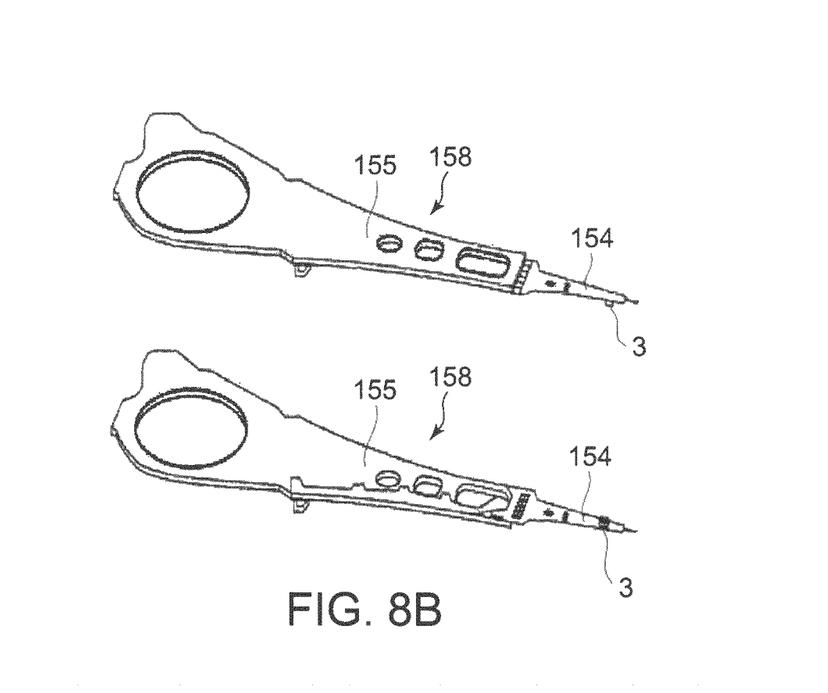

FIG. 8B is a perspective view illustrating a magnetic head stack assembly (head gimbal assembly referred to as "HGA") 158 to compose a portion of the head stack assembly 160.

As illustrated in FIG. 8A, the head stack assembly 160 has the bearing portion 157, a head gimbal assembly (HGA) 158 extending from the bearing portion 157, and a suspension flame 161 which extends from the bearing portion 157 in a direction opposite to HGA 158 and suspends a coil 162 of the voice coil motor.

As shown in FIG. 8B, HGA 158 has the actuator arm 155 extending from the bearing portion 157, and the suspension 154 extending from the actuator arm 155.

A head slider 3 is attached at the tip of the suspension 154. Then, either one of the magnetic recording heads according to the first embodiment is carried by the head slider 3.

The magnetic head assembly (head gimbal assembly) 158 according to the embodiment is provided with a magnetic recording head according to the embodiment, a head slider 3 carrying the magnetic recording head, a suspension 154 carrying the head slider 3 on one end thereof, and an actuator arm 155 connected to the other end of the suspension 154.

The suspension 154 has a lead for write-in/read-out of signals, a lead for a heater to adjust the flying height and a lead (not shown) for the oscillation of the spin torque oscillator. These leads are electrically connected to the respective electrodes of the magnetic recording head 110 built into the head slider 3. In addition, electrode pads (not shown) are provided in the head gimbal assembly 158. The "electrode pads" are referred to as the "pads" simply below. Eight pads are provided in this example. That is, the head gimbal assembly 158 is provided with two pads for the coils of the magnetic pole 61, two pads for a magnetic reproducing element 71, two pads for DFH (dynamic flying height), and two pads for STO 10.

Then, a signal processor 190 is also provided to perform write-in/read-out of signals on/from the magnetic recording medium using the magnetic recording head. The signal processor 190 is mounted onto the back side of the drawing of the magnetic recording apparatus 150 illustrated in FIG. 7, for example. Input-output lines are connected to the pads of the head gimbal assembly 158, and connected electrically to the magnetic recording head.

Thus, the magnetic recording apparatus 150 according to this embodiment is provided with the magnetic recording medium, one of the magnetic recording heads according to the above-mentioned first embodiment, a movable portion, a position controller and a signal processor. The movable portion enables the magnetic recording medium and the magnetic recording head to relatively move to each other while the magnetic recording head flies above or in contact with the magnetic recording medium. The movable portion also enables the magnetic recording medium and the magnetic recording head to face each other. The position controller arranges the magnetic recording head on a prescribed position of the magnetic recording medium. The signal processor performs write-in/read-out of signals on/from the magnetic recording medium.

That is, the recording medium disk 180 is used as the magnetic recording medium mentioned above.

The above-mentioned movable portion can include the head slider 3.

The above-mentioned position controller can include the head gimbal assembly 158.

That is, the magnetic recording apparatus 150 according to this embodiment is provided with a magnetic recording medium, the magnetic head assembly according to the embodiment and the signal processor 190 to perform write-in/read-out of signals on/from the magnetic recording medium using a magnetic recording head mounted onto the magnetic head assembly.

According to the magnetic recording apparatus 150 of this embodiment, using one of the magnetic recording heads according to the first embodiment mentioned above allows it to provide a magnetic recording apparatus capable of performing stable RF field-assist recording with high recording density.

In the magnetic recording apparatuses according to the second embodiment, STO 10 can be arranged on the trailing side of the magnetic pole 61. In this case, a magnetic recording layer 81 of the magnetic recording medium 80 firstly faces the magnetic pole 61, and secondly faces STO 10.

STO 10 can be arranged on the leading side of the magnetic pole 61. In this case, the magnetic recording layer 81 of the magnetic recording medium 80 firstly faces STO 10, and secondly faces the magnetic pole 61.

The magnetic recording medium for the magnetic recording apparatuses of the second embodiment mentioned above is explained below.

Figure 9A:
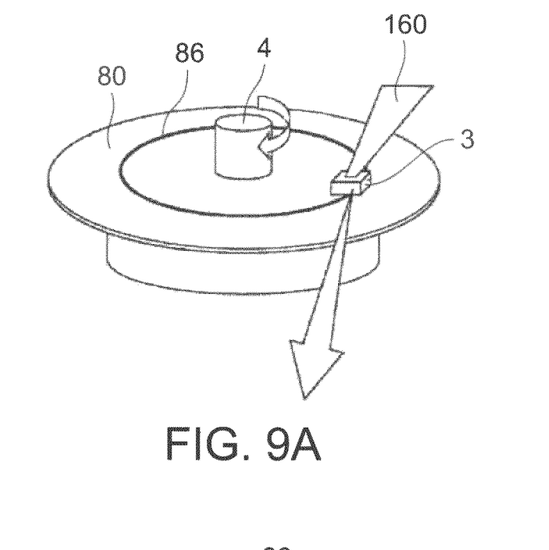
FIGS. 9A and 9B are perspective views illustrating compositions of a magnetic recording medium of the magnetic recording apparatus according to the second embodiment.
Figure 9B:
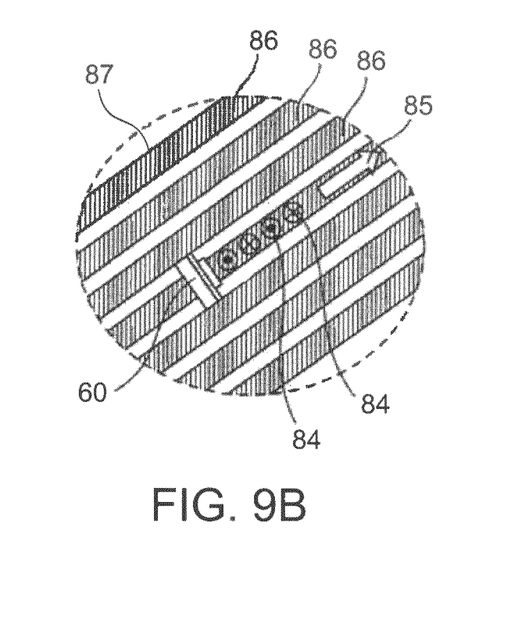

FIGS. 9A and 9B are typical perspective views illustrating compositions of the magnetic recording medium of the magnetic recording apparatus according to the embodiment.

As shown in FIGS. 9A and 9B, the magnetic recording medium 80 employed for the magnetic recording apparatus according to the embodiment has magnetic discrete tracks (recording tracks) 86 including magnetic grains which are separated from each other by a nonmagnetic material (or air) 87 and have a magnetization direction perpendicular to the medium surface. When this magnetic recording medium 80 is rotated by the spindle motor 4 and moves in a medium moving direction 85, one of the magnetic recording heads according to the first embodiment mentioned above is employed to thereby form recorded magnetization 84.

Thus, the magnetic recording medium 80 may be a discrete track medium where the adjacent recording tracks are formed to be separated from each other by the nonmagnetic portions on the magnetic recording medium according to the embodiment.

The width (TS) of STO 10 in the track width direction is set to the width (TW) of the tracks 86 or larger and the recording track pitch or narrower. This setting allows it to prevent a reduction in the coercivity of the adjacent recording tracks due to a leaked RF magnetic field from STO 10. For this reason, using the magnetic recording medium 80 of this example, RF field-assist recording can be performed just on a targeted track to be recorded.

According to this example, it is easier to enable the RF field-assist recording apparatus for a narrow track rather than to use a perpendicular magnetic recording medium including magnetic grains, i.e., an unprocessed continuous film. According to a conventional magnetic recording method, it was impossible to use FePt, SmCo, etc. as magnetic fine grains, because the magnetic fine grains of FePt, SmCo, etc. having extremely high magnetic anisotropy energy (Ku) were too difficult to switch the magnetization direction thereof, i.e., to write in.

The magnetic recording apparatus according to this embodiment is capable of firmly recording even on the discrete type magnetic recording medium 80 having a high coercivity, thereby allowing it to perform high-density and high-speed recording.

Figure 10A:
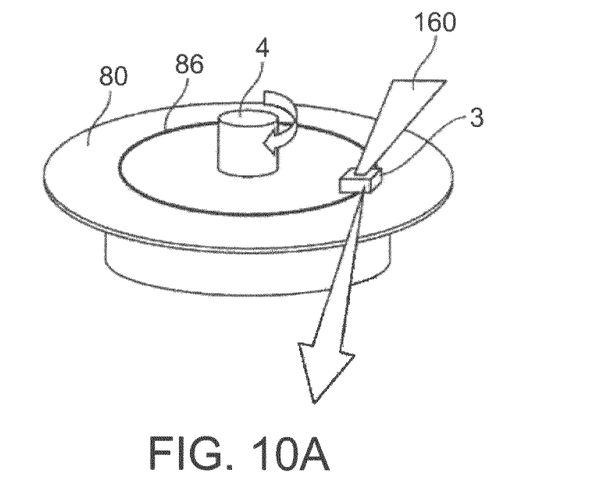
FIGS. 10A and 10B are perspective views illustrating compositions of another magnetic recording medium of the magnetic recording apparatus according to the second embodiment.
Figure 10B:
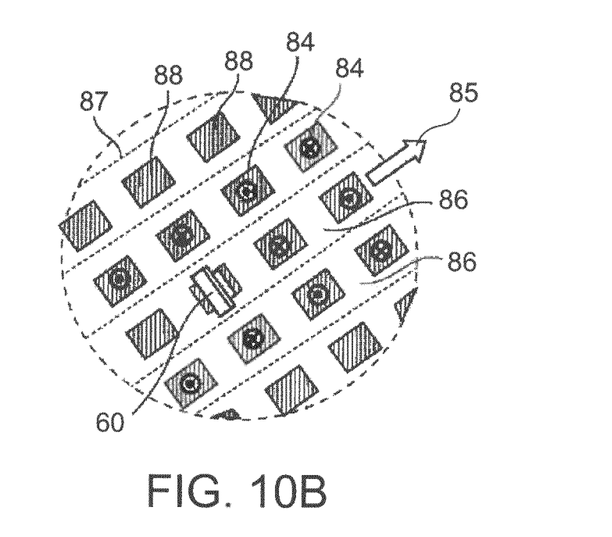

FIGS. 10A and 10B are typical perspective views illustrating compositions of another magnetic recording medium of the magnetic recording apparatus according to the embodiment.

As illustrated in FIGS. 10A and 10B, another magnetic recording medium 80 for the magnetic recording apparatus according to the second embodiment has magnetic discrete bits 88 separated from each other by the nonmagnetic material 87. When this magnetic recording medium 80 is rotated by the spindle motor 4 and moves in the medium moving direction 85, the magnetic recording head according to the first embodiment can form recorded magnetization 84.

Thus, the magnetic recording medium 80 may be a discrete bit medium of which recording magnetic dots are separated from each other by the nonmagnetic portions to be regularly arranged on the magnetic recording medium according to the embodiment.

The magnetic recording apparatus according to the second embodiment is capable of firmly recording even on the discrete type magnetic recording medium 80 with a high coercivity, thereby allowing it to perform high-density and high-speed recording.

The width (TS) of STO 10 in the track width direction is set to the width (TW) of the tracks 86 or larger and the recording track pitch or narrower. This setting allows it to prevent a reduction in the coercivity of the adjacent recording tracks due to a leaked RF magnetic field from STO 10. For this reason, using the magnetic recording medium 80 of this example, the RF magnetic field-assist recording can be performed just on the targeted track to be recorded. According to this example, enhancing the anisotropy energy (Ku) and miniaturizing the magnetic discrete bits 88 possibly provide an RF field-assist recording apparatus having a high recording density of 10 Tbits/inch$^2$ or more, as long as the heat fluctuation tolerance of the bits 88 is maintained under the usage environment thereof.

As described above, according to the first embodiment, a magnetic recording head includes a magnetic pole, a spin torque oscillator, a first shield and a second shield. The magnetic pole has an air-bearing surface. The spin torque oscillator is provided so that a first side of the spin torque oscillator faces the magnetic pole in a first direction parallel to the air-bearing surface. The first shield includes a granular magnetic material, and is provided so that two portions of the first shield sandwich the spin torque oscillator in a second direction which is parallel to the air-bearing surface and perpendicular to the first direction. The second shield is provided on a second side of the spin torque oscillator opposite to the first side.

According to the first embodiment, another magnetic recording head includes a magnetic pole, a spin torque oscillator, a first shield and a second shield. The magnetic pole has an air-bearing surface. The spin torque oscillator is provided so that a first side of the spin torque oscillator faces the magnetic pole in a first direction parallel to the air-bearing surface. The first shield includes a granular magnetic material, and is provided so that the first shield surrounds the spin torque oscillator other than a second side thereof opposite to the first side in a second direction which is parallel to the air-bearing surface and perpendicular to the first direction. The second shield includes an alloy magnetic material, and is provided so that the second shield faces the second side and surrounds the first shield and the magnetic pole.

According to the first embodiment, another magnetic recording head includes a magnetic pole, a spin torque oscillator, a first shield and a second shield. The magnetic pole has a air-bearing surface. The spin torque oscillator is provided so that a first side of the spin torque oscillator faces the magnetic pole in a first direction parallel to the air-bearing surface. The first shield includes a granular magnetic material, and is provided so that the first shield faces the spin torque oscillator in a second direction which is parallel to the air-bearing surface and perpendicular to the first direction. The second shield includes an alloy magnetic material, and is provided so that the second shield faces at least a second side the spin torque oscillator opposite to the first side and adjacent to the magnetic pole in the second direction.

According to the second embodiment, a magnetic recording/reproducing apparatus includes a magnetic recording medium, a magnetic recording head, a movable portion, a position control unit and a signal processor. The magnetic recording head includes a magnetic pole, a spin torque oscillator, a first shield, a second shield, a first electrode and a second electrode. The magnetic pole has an air-bearing surface. The spin torque oscillator is provided so that a first side of the spin torque oscillator faces the magnetic pole in a first direction parallel to the air-bearing surface. The first shield includes a granular magnetic material, and is provided so that two portions of the first shield sandwich the spin torque oscillator in a second direction which is parallel to the air-bearing surface and perpendicular to the first direction. The second shield is provided on a second side of the spin torque oscillator opposite to the first side. The spin torque oscillator includes a first magnetic layer having a coercivity lower than a magnetic field applied from the magnetic pole, a second magnetic layer having a coercivity lower than a magnetic field applied from the magnetic pole, and an intermediate layer provided between the first magnetic layer and the second magnetic layer. The first electrode is provided on a side of the first magnetic layer on which the intermediate layer is not provided, and capable of passing a current through the spin torque oscillator. The second electrode is provided on a side of the second magnetic layer on which the intermediate layer is not provided, and capable of passing a current through the spin torque oscillator. The movable portion enables a relative movement between the magnetic recording medium and the magnetic recording head so that the magnetic recording head flies above or in contact with the magnetic recording medium while facing the magnetic recording head. The position control unit controls the magnetic head assembly so that the magnetic head assembly is arranged on a predetermined recording position on the magnetic recording medium. The signal processor performs processing of a signal for writing on the magnetic recording medium and a signal for reading from the magnetic recording medium by the use of the magnetic recording head.

While certain embodiments of the invention have been described, these embodiments have been presented by way of example only, and are not intended to limit the scope of the inventions. Indeed, the novel elements and apparatuses described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A magnetic recording head comprising:
a magnetic pole having an air-bearing surface;
a spin torque oscillator provided so that a first side of the spin torque oscillator faces the magnetic pole in a first direction parallel to the air-bearing surface;
a first shield including a granular magnetic material provided so that the spin torque oscillator is sandwiched between two portions of the first shield in a second direction, the second direction being parallel to the air-bearing surface and perpendicular to the first direction; and
a second shield provided on a second side of the spin torque oscillator opposite to the first side, wherein
a resonant frequency of the granular magnetic material is higher than a frequency of a radio-frequency magnetic field generated by the spin torque oscillator.

2. The head according to claim 1, wherein
the magnetic material includes a material selected from the group consisting of CoNiFe, CoCr, CoCrPt, CoCrTa, CoCrTaPt, CoCrTaNb, TbFeCo, CoPt, FePt, CoPd, FePd, and SmCo.

3. The head according to claim 1, further comprising a first electrode and a second electrode, wherein
the spin torque oscillator includes:
a first magnetic layer having a coercivity lower than a magnetic field applied from the magnetic pole;
a second magnetic layer having a coercivity lower than the magnetic field applied from the magnetic pole; and
an intermediate layer provided between the first magnetic layer and the second magnetic layer,
the first electrode is provided on a side of the first magnetic layer on which the intermediate layer is not provided, and capable of passing a current through the spin torque oscillator; and
the second electrode is provided on a side of the second magnetic layer on which the intermediate layer is not provided, and capable of passing a current through the spin torque oscillator.

4. The head according to claim 1, wherein
a magnetic grain included in the granular magnetic material satisfies a relationship of $K_u V < k_B T$, when
$K_u$ is an anisotropy energy (erg/cc);
V is a volume (cc) of the magnetic grain;
$K_b$ is a Boltzmann constant ($1.38 \times 10^{-16}$ (erg/K)); and
T is an absolute temperature (K).

5. The head according to claim 4, wherein
the magnetic grain included in the granular magnetic material is 3 nm or less in diameter.

6. The head according to claim 4, wherein
an anisotropy field of the magnetic grain is 5.2 kOe or higher.

7. The head according to claim 4, wherein
the magnetic grain includes a material selected from the group consisting of CoNiFe CoCr, CoCrPt, CoCrTa, CoCrTaPt, CoCrTaNb, TbFeCo, CoPt, FePt, CoPd, FePd and SmCo.

8. The head according to claim 4, further comprising a first electrode and a second electrode, wherein
the spin torque oscillator includes:
a first magnetic layer having a coercivity lower than a magnetic field applied from the magnetic pole;
a second magnetic layer having a coercivity lower than the magnetic field applied from the magnetic pole; and
an intermediate layer provided between the first magnetic layer and the second magnetic layer,
the first electrode is provided on a side of the first magnetic layer on which the intermediate layer is not provided, and capable of passing a current through the spin torque oscillator; and
the second electrode is provided on a side of the second magnetic layer on which the intermediate layer is not provided, and capable of passing a current through the spin torque oscillator.

9. A magnetic recording/reproducing apparatus comprising:
a magnetic recording medium;
a magnetic recording head including:
a magnetic pole having an air-bearing surface;
a spin torque oscillator provided so that a first side of the spin torque oscillator faces the magnetic pole in a first direction parallel to the air-bearing surface;
a first shield including a granular magnetic material provided so that the spin torque oscillator is sandwiched between two portions of the first shield in a second direction, the second direction being parallel to the air-bearing surface and perpendicular to the first direction;
a second shield provided on a second side of the spin torque oscillator opposite to the first side;
a first electrode; and
a second electrode,
wherein
a resonant frequency of the granular magnetic material is higher than a frequency of a radio-frequency magnetic field generated by the spin torque oscillator;
the spin torque oscillator includes a first magnetic layer having a coercivity lower than a magnetic field applied from the magnetic pole, a second magnetic layer having a coercivity lower than a magnetic field applied from the magnetic pole, and an intermediate layer provided between the first magnetic layer and the second magnetic layer;

the first electrode is provided on a side of the first magnetic layer on which the intermediate layer is not provided, and capable of passing a current through the spin torque oscillator; and the second electrode is provided on a side of the second magnetic layer on which the intermediate layer is not provided, and capable of passing a current through the spin torque oscillator, a movable portion to enable a relative movement between the magnetic recording medium and the magnetic recording head so that the magnetic recording head flies above or in contact with the magnetic recording medium while facing the magnetic recording head;

a position control unit to control the magnetic recording head so that the magnetic recording head is arranged on a predetermined recording position on the magnetic recording medium; and a signal processor to perform processing of a signal for writing on the magnetic recording medium and a signal for reading from the magnetic recording medium by the use of the magnetic recording head.

10. The recording/reproduction apparatus according to claim 9, wherein the magnetic recording medium is a discrete track medium having tracks adjacent to each other formed through a nonmagnetic member.

11. The recording/reproduction apparatus according to claim 9, wherein the magnetic recording medium is a discrete bit medium having recording magnetic dots isolated from each other through a nonmagnetic member and arrayed regularly.

\* \* \* \* \*